(12) United States Patent
Hidaka et al.

(10) Patent No.: US 7,604,089 B2
(45) Date of Patent: Oct. 20, 2009

(54) STORAGE CHECK FOR LOCKING VEHICLE STEERING SYSTEM

(75) Inventors: Kenichirou Hidaka, Chita-gun (JP); Hisashi Kameya, Kariya (JP)

(73) Assignee: Denso Corporation, Kariya (JP)

( * ) Notice: Subject to any disclaimer, the term of this patent is extended or adjusted under 35 U.S.C. 154(b) by 296 days.

(21) Appl. No.: 11/822,597

(22) Filed: Jul. 9, 2007

(65) Prior Publication Data
US 2008/0006470 A1    Jan. 10, 2008

(30) Foreign Application Priority Data
Jul. 10, 2006   (JP) .............................. 2006-189746

(51) Int. Cl.
*B62D 6/00*   (2006.01)
*B62D 5/04*   (2006.01)

(52) U.S. Cl. .......................... 180/446; 701/43; 180/444

(58) Field of Classification Search ................. 180/446; 701/43
See application file for complete search history.

(56) References Cited

U.S. PATENT DOCUMENTS

| | | | | |
|---|---|---|---|---|
| 4,535,332 A | * | 8/1985 | Miller et al. ............... 340/3.51 |
| 5,373,911 A | * | 12/1994 | Yasui .......................... 180/168 |
| 5,511,183 A | * | 4/1996 | Ohmido ........................ 714/14 |
| 6,164,150 A | | 12/2000 | Shindo et al. |
| 6,834,742 B2 | * | 12/2004 | Nakatsu et al. ............. 180/444 |
| 6,840,347 B2 | * | 1/2005 | Nakatsu et al. ............. 180/444 |
| 6,915,194 B2 | * | 7/2005 | Kodama et al. ................ 701/41 |
| 2004/0188172 A1 | * | 9/2004 | Asada .......................... 180/446 |
| 2004/0238261 A1 | * | 12/2004 | Kodama et al. ............. 180/443 |

FOREIGN PATENT DOCUMENTS

| JP | 03002023 A | * | 1/1991 |
|---|---|---|---|
| JP | 2001-048032 | | 2/2001 |

\* cited by examiner

*Primary Examiner*—Lesley D Morris
*Assistant Examiner*—Wesley Potter
(74) *Attorney, Agent, or Firm*—Nixon & Vanderhye P.C.

(57) ABSTRACT

A storage part stores an initial sum, which is obtained by summing a steering angle of a steering wheel and a rotational angle of an electric actuator before checking of unlocking of a transmission ratio variable mechanism by a computer part. The computer part determines that the storage part is abnormal when a sum, which is obtained by summing the steering angle of the steering wheel and the rotational angle of the electric actuator after the checking of the unlocking of the transmission ratio variable mechanism by the computer part, differs from the initial sum, which is retrieved from the storage part.

17 Claims, 7 Drawing Sheets

|  |  | INITIAL ROTATIONAL ANGLE | |
|---|---|---|---|
|  |  | ≦THRESHOLD ANGLE | >THRESHOLD ANGLE |
| FLAG | ON | ABNORMAL | NORMAL |
|  | OFF | NORMAL | ABNORMAL |

STORAGE CHECK FOR LOCKING VEHICLE STEERING SYSTEM

CROSS REFERENCE TO RELATED APPLICATION

This application is based on and incorporates herein by reference Japanese Patent Application No. 2006-189746 filed on Jul. 10, 2006.

BACKGROUND OF THE INVENTION

1. Field of the Invention

The present invention relates to a vehicle steering system that includes a transmission ratio variable mechanism, which changes a transmission ratio between a steering angle of a steering wheel and a turning angle of steerable vehicle wheels.

2. Description of Related Art

In a known vehicle steering system, a transmission ratio variable mechanism is locked by locking a rotatable member, which is rotated synchronously with an electric actuator of the transmission ratio variable mechanism at the time of changing a transmission ratio between a steering angle of a steering wheel and a turning angle of steerable vehicle wheels. In this type of vehicle steering system, the transmission ratio variable mechanism is unlocked by releasing, i.e., unlocking the rotatable member through disengagement of an engaging member, which is engaged with the rotatable member to lock the rotatable member. In Japanese Unexamined Patent Publication Number 2001-48032, the transmission ratio variable mechanism is unlocked by rotating the rotatable member with use of an electric actuator.

Normally, in the vehicle steering system of the above type, a rotational angle of the electric actuator is stored in a storage means (e.g., a memory). Then, the stored rotational angle of the electric actuator is retrieved from the storage means and is used in the control operation of the transmission ratio. Therefore, it is necessary that the storage means is normal to correctly control the transmission ratio. Because of this, for example, a limit rotational angle in a normal operation may be set as a threshold angle. Then, when the rotational angle, which is retrieved from the storage means, exceeds the threshold angle, the storage means may be determined as abnormal. However, this technique may have the following disadvantage. In a particular case where the locking and unlocking of the transmission ratio variable mechanism are repeated, for example, when a rotational direction of the electric actuator is limited to a single rotational direction at the time of checking the unlocking of the transmission ratio variable mechanism, the rotational angle, which is stored in the storage means, may exceed the threshold angle, so that the storage means may be erroneously determined as abnormal.

SUMMARY OF THE INVENTION

The present invention addresses the above disadvantage. According to one aspect of the present invention, there is provided a vehicle steering system, which includes a transmission ratio variable mechanism, a rotatable member, a lock means, a control means, a storage means and a sensing means. The transmission ratio variable mechanism is placed between a steering wheel and steerable vehicle wheels in a vehicle and includes an electric actuator, which is rotated to change a transmission ratio between a steering angle of the steering wheel and a turning angle of the steerable vehicle wheels. The transmission ratio variable mechanism makes a change in the turning angle of the steerable vehicle wheels in a generally linear relationship with a sum of the steering angle of the steering wheel and a rotational angle of the electric actuator. The rotatable member is rotated synchronously with the electric actuator. The lock means is for locking and unlocking the transmission ratio variable mechanism. The lock means locks the transmission ratio variable mechanism by holding the rotatable member and unlocks the transmission ratio variable mechanism by releasing the rotatable member. The control means is for controlling the electric actuator and for checking whether the unlocking of the transmission ratio variable mechanism succeeds by rotating the rotatable member through rotation of the electric actuator in a stopped state of the vehicle. The storage means is for storing an initial sum, which is obtained by summing the steering angle of the steering wheel and the rotational angle of the electric actuator before the checking of the unlocking of the transmission ratio variable mechanism by the control means. The sensing means is for sensing an abnormality of the storage means. The sensing means determines that the storage means is abnormal when a sum, which is obtained by summing the steering angle of the steering wheel and the rotational angle of the electric actuator after the checking of the unlocking of the transmission ratio variable mechanism by the control means, differs from the initial sum, which is retrieved from the storage means.

According to another aspect of the present invention, there is provided a vehicle steering system, which includes a transmission ratio variable mechanism, a rotatable member, a lock means, a control means, a storage means and a sensing means. The transmission ratio variable mechanism is placed between a steering wheel and steerable vehicle wheels in a vehicle and includes an electric actuator, which is rotated to change a transmission ratio between a steering angle of the steering wheel and a turning angle of the steerable vehicle wheels. The transmission ratio variable mechanism makes a change in the turning angle of the steerable vehicle wheels in a generally linear relationship with a sum of the steering angle of the steering wheel and a rotational angle of the electric actuator. The rotatable member is rotated synchronously with the electric actuator. The lock means is for locking and unlocking the transmission ratio variable mechanism. The lock means locks the transmission ratio variable mechanism by holding the rotatable member and unlocks the transmission ratio variable mechanism by releasing the rotatable member. The control means is for controlling the electric actuator and for checking whether the unlocking of the transmission ratio variable mechanism succeeds by rotating the rotatable member through rotation of the electric actuator in a stopped state of the vehicle. The storage means is for storing an initial steering angle of the steering wheel and an initial rotational angle of the electric actuator, which are obtained before the checking of the unlocking of the transmission ratio variable mechanism by the control means. The sensing means is for sensing an abnormality of the storage means. The sensing means determines that the storage means is abnormal when a sum, which is obtained by summing the steering angle of the steering wheel and the rotational angle of the electric actuator after the checking of the unlocking of the transmission ratio variable mechanism by the control means, differs from a sum, which is obtained by summing the initial steering angle of the steering wheel and the initial rotational angle of the electric actuator that are retrieved from the storage means.

According to another aspect of the present invention, there is provided a vehicle steering system, which includes a transmission ratio variable mechanism, a rotatable member, a lock means, a control means, a storage means and a sensing means.

The transmission ratio variable mechanism is placed between a steering wheel and steerable vehicle wheels in a vehicle and includes an electric actuator, which is rotated to change a transmission ratio between a steering angle of the steering wheel and a turning angle of the steerable vehicle wheels. The rotatable member is rotated synchronously with the electric actuator. The lock means is for locking and unlocking the transmission ratio variable mechanism. The lock means locks the transmission ratio variable mechanism by holding the rotatable member and unlocks the transmission ratio variable mechanism by releasing the rotatable member. The control means is for controlling the electric actuator and for checking whether the unlocking of the transmission ratio variable mechanism succeeds by rotating the rotatable member through rotation of the electric actuator. The storage means is for storing an initial rotational angle of the electric actuator and initial information. The initial rotational angle of the electric actuator is obtained in a locked state of the transmission ratio variable mechanism before the checking of the unlocking of the transmission ratio variable mechanism by the control means. The initial information indicates a magnitude relation between the initial rotational angle of the electric actuator and a threshold angle set in a preset rotational direction before the checking of the unlocking of the transmission ratio variable mechanism by the control means. The sensing means is for sensing an abnormality of the storage means. The sensing means determines that the storage means is abnormal when a magnitude relation between the initial rotational angle of the electric actuator, which is retrieved from the storage means, and the threshold angle differs from the magnitude relation, which is indicated by the initial information that is retrieved from the storage means.

According to another aspect of the present invention, there is provided a vehicle steering system, which includes a transmission ratio variable mechanism, a rotatable member, a lock means, a control means, a storage means and a sensing means. The transmission ratio variable mechanism is placed between a steering wheel and steerable vehicle wheels in a vehicle and includes an electric actuator, which is rotated to change a transmission ratio between a steering angle of the steering wheel and a turning angle of the steerable vehicle wheels. The rotatable member is rotated synchronously with the electric actuator. The lock means is for locking and unlocking the transmission ratio variable mechanism. The lock means locks the transmission ratio variable mechanism by holding the rotatable member and unlocks the transmission ratio variable mechanism by releasing the rotatable member. The control means is for controlling the electric actuator and for checking whether the unlocking of the transmission ratio variable mechanism succeeds by rotating the rotatable member through rotation of the electric actuator. The storage means is for storing an initial rotational angle of the electric actuator, which is obtained in a locked state of the transmission ratio variable mechanism before the checking of the unlocking of the transmission ratio variable mechanism by the control means. The sensing means is for sensing an abnormality of the storage means. The sensing means determines that the storage means is abnormal when the initial rotational angle of the electric actuator, which is retrieved from the storage means, is larger than a threshold angle set in a preset rotational direction. When a rotational angle of the electric actuator, which is obtained after the checking of the unlocking of the transmission ratio variable mechanism, differs from the initial rotational angle of the electric actuator, which is retrieved from the storage means, the control means returns the rotational angle of the electric actuator to the initial rotational angle of the electric actuator by rotating the electric actuator.

According to another aspect of the present invention, there is provided a vehicle steering system, which includes a transmission ratio variable mechanism, a rotatable member, a lock means, a control means, a storage means and a sensing means. The transmission ratio variable mechanism is placed between a steering wheel and steerable vehicle wheels in a vehicle and includes an electric actuator, which is rotated to change a transmission ratio between a steering angle of the steering wheel and a turning angle of the steerable vehicle wheels. The rotatable member is rotated synchronously with the electric actuator. The lock means is for locking and unlocking the transmission ratio variable mechanism. The lock means locks the transmission ratio variable mechanism by holding the rotatable member and unlocks the transmission ratio variable mechanism by releasing the rotatable member. The control means is for controlling the electric actuator and for checking whether the unlocking of the transmission ratio variable mechanism succeeds by rotating the rotatable member through rotation of the electric actuator in a preset rotational direction. The storage means is for storing an initial rotational angle of the electric actuator, which is obtained in a locked state of the transmission ratio variable mechanism before the checking of the unlocking of the transmission ratio variable mechanism by the control means. The sensing means is for sensing an abnormality of the storage means. The sensing means determines that the storage means is abnormal when the initial rotational angle of the electric actuator, which is retrieved from the storage means, is larger than a threshold angle set in the preset rotational direction. When a difference between the initial rotational angle of the electric actuator, which is retrieved from the storage means, and the threshold angle, is smaller than an allowable angle, the control means unlocks the transmission ratio variable mechanism by controlling the lock means and checks whether the unlocking of the transmission ratio variable mechanism succeeds by rotating the rotatable member through rotation of the electric actuator upon reversing the preset rotational direction of the electric actuator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings. Throughout the following embodiments, similar components will be indicated by the same numerals, and redundant description of the similar components will be eliminated for the sake of simplicity.

First Embodiment

Figure 1:
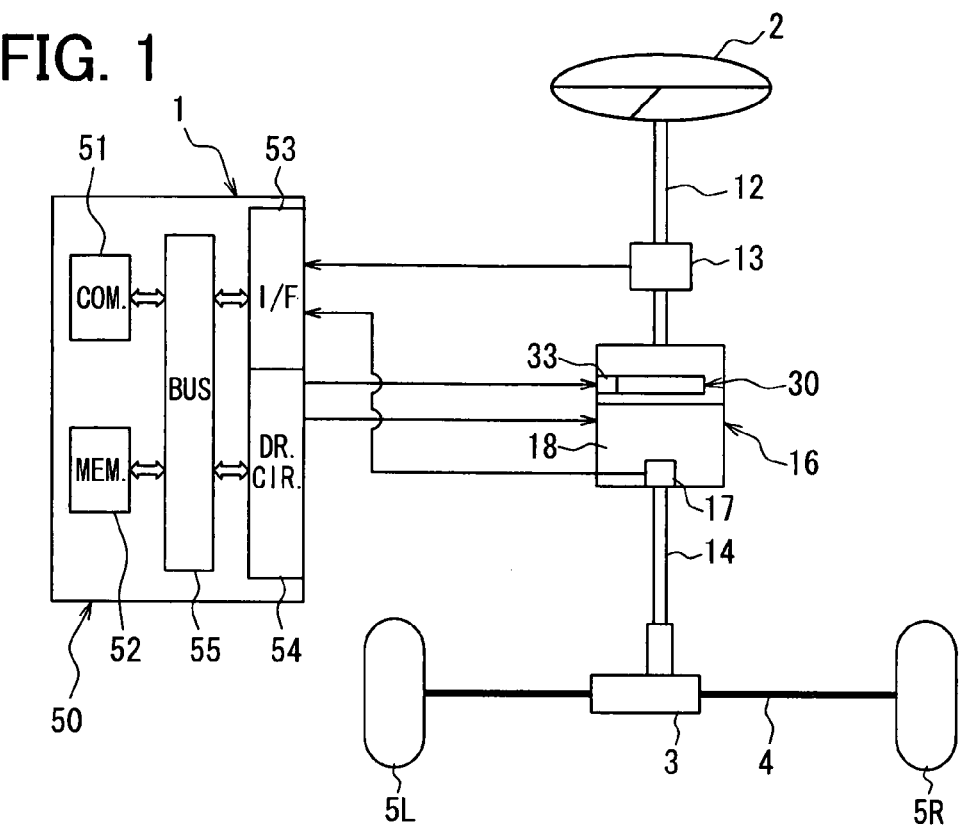
FIG. 1 is a schematic diagram showing a vehicle steering system according to a first embodiment of the present invention.

As shown in FIG. 1, a vehicle steering system 1 according to a first embodiment of the present invention includes a transmission ratio variable mechanism 10, a locking mechanism 30 and a steering control apparatus 50.

The transmission ratio variable mechanism 10 includes an input shaft 12, a steering angle sensor 13, an output shaft 14, an electric actuator 16 and a rotational angle sensor 17. The input shaft 12 is connected to a steering wheel 2 of the vehicle. The steering angle sensor 13 is provided to the input shaft 12 and outputs data, which relates to a steering angle θh of the steering wheel 2. The output shaft 14 is connected to left and right steerable vehicle wheels 5R, 5L through a gear apparatus 3 and a rack shaft 4, which form a rack-and-pinion. The output shaft 14 is connected to the electric actuator 16.

Figure 2:
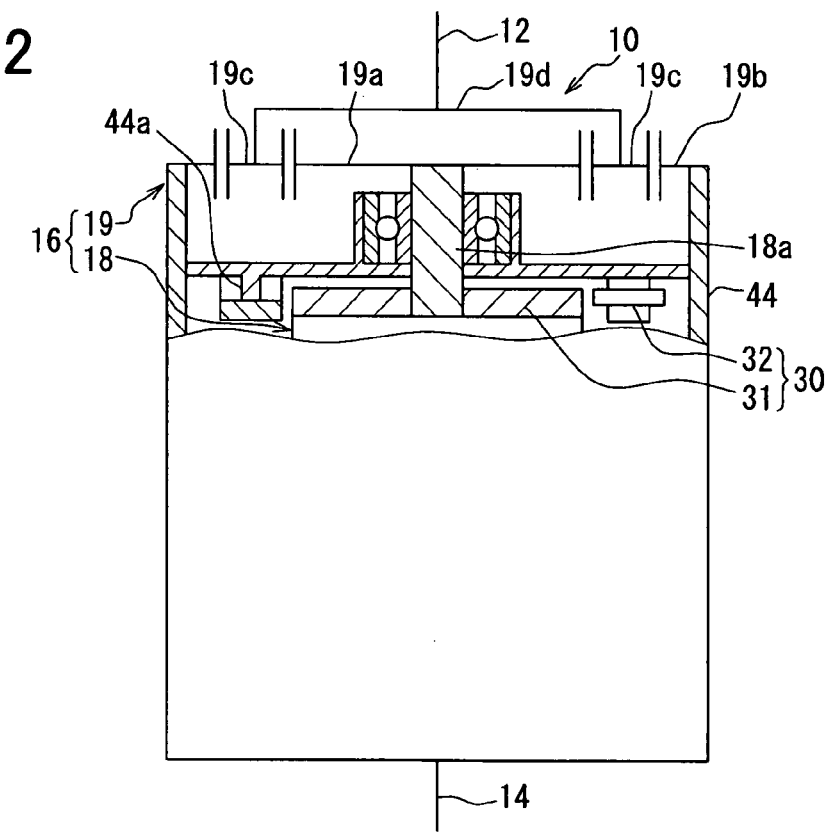
FIG. 2 is a schematic diagram showing an electric actuator and a locking mechanism according to the first embodiment.

As shown in FIG. 2, the electric actuator 16 includes a speed reducer 19, which is provided to an output side of an electric motor 18. Specifically, the electric motor 18 may be, for example, a servo motor. When an internal coil of the electric motor 18 is energized, a motor shaft 18a of the electric motor 18 is rotated. In the speed reducer 19, which includes a planetary gear mechanism, a sun gear 19a is connected to the motor shaft 18a of the electric motor 18, and a ring gear 19b is connected to the output shaft 14. Furthermore, at the speed reducer 19, multiple planet gears 19c, which are arranged between the sun gear 19a and the ring gear 19b, are supported by a planetary carrier 19d in a manner that permits planetary motion of the planet gears 19c. The planetary carrier 19d is connected to the input shaft 12. Therefore, the speed reducer 19 can reduce the rotational speed of the electric motor 18 and outputs the rotation of the reduced rotational speed to the input and output shaft 12, 14 side. Here, an output rotational angle θa from the speed reducer 19 can be expressed by the following equation 1 through use of a rotational angle θm of the motor shaft 18a and a speed reducing ratio K of the speed reducer 19.

$$\theta a = K \cdot \theta m \qquad \text{Equation 1}$$

As shown in FIG. 1, the rotational angle sensor 17 is provided to the electric motor 18 and outputs the rotational angle θm of the motor shaft 18a shown in FIG. 2.

In the transmission ratio variable mechanism 10, in addition to the steering angle θh of the steering wheel 2, the output rotational angle θa provided from the speed reducer 19 of the electric actuator 16 is transmitted to the output shaft 14. Thus, the transmission ratio variable mechanism 10 outputs a sum of the steering angle θh and the rotational angle θa from the output shaft 14. Here, an apparent gear ratio G between the input shaft 12 and the output shaft 14 at the transmission ratio variable mechanism 10 can be expressed by the following equation 2, so that a transmission ratio (a steering ratio) R between the steering angle θh of the steering wheel 2 and a turning angle θs of the steerable vehicle wheels 5R, 5L can be expressed by the following equation 3 through use of a gear ratio g of the gear apparatus 3. Therefore, based on the equation 3, it is understandable that the transmission ratio R changes according to the rotational output of the electric actuator 16. Furthermore, based on the equation 3, the turning angle θs of the steerable vehicle wheels 5R, 5L can be expressed by the following equation 4. Therefore, it is understandable that the turning angle θs changes linearly relative to a sum of the steering angle θh and the rotational angle θa. Furthermore, based on the equation 4, it is understandable that a sum of the steering angle θh and the rotational angle θa is kept constant regardless of the rotational output from the electric actuator 16 in a stopped state of the vehicle (i.e., a non-traveling state of the vehicle), in which a change in the turning angle θs is limited due to friction between the steerable vehicle wheels 5R, 5L and a road, on which the vehicle is stopped.

$$G = 1 + \theta a/\theta h \qquad \text{Equation 2}$$

$$R = g \cdot G = g \cdot (1 + \theta a/\theta h) \qquad \text{Equation 3}$$

$$\theta s = g \cdot (\theta h + \theta a) \qquad \text{Equation 4}$$

Figures 3, 7:
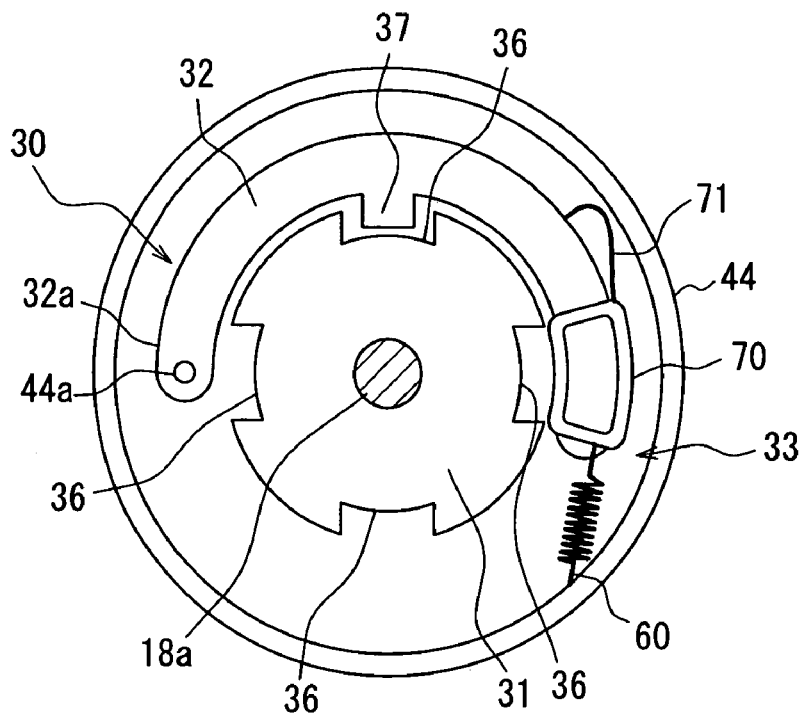
FIG. 3 is a schematic diagram showing the locking mechanism according to the first embodiment of the present invention.
FIG. 7 is a diagram for describing the control operation of the vehicle steering system of the third embodiment.

As shown in FIG. 3, the locking mechanism 30 includes a lock holder 31, a lock arm 32 and an arm driver 33. The lock holder 31 is formed into a disk shape and is coaxially installed to the motor shaft 18a of the electric motor 18. Multiple engaging recesses 36 are arranged at generally equal intervals along an outer peripheral edge of the lock holder 31 in such a manner that each recess 36 is recessed toward a rotational center of the lock holder 31.

The lock arm 32 is formed into a generally arcuate shape and is placed radially outward of the lock holder 31. A base end portion 32a of the lock arm 32 is pivotably supported by a pin 44a, which is fixed to a housing 44. An engaging projection 37 is provided in an intermediate portion of the lock arm 32 to project toward the lock holder 31. A drive coil (electromagnetic coil) 70 of the arm driver 33 is provided to a distal end portion of the lock arm 32. A metal plate (a magnetic plate) 71 of the arm driver 33 is fixed to the housing 44 to oppose the drive coil 70. One end of a spring 60 of the arm driver 33 is fixed to the housing 44, and the other end of the spring 60 is fixed to the distal end portion of the lock arm 32. An urging force of the spring 60 pulls the distal end portion of the lock arm 32 in a downward direction in FIG. 3. When the drive coil 70 is energized, an electromagnetic repulsive force is generated between the drive coil 70 and the metal plate 71, so that the lock arm 32 is swung in an upward direction in FIG. 3.

When the drive coil 70 is deenergized, the lock arm 32 is pulled by the urging force of the spring 60 to swing about the pin 44a toward the lock holder 31. Therefore, the engaging projection 37 of the lock arm 32 is engaged with one of the engaging recesses 36, and the lock holder 31, which is installed to the motor shaft 18a, is held by the lock arm 32 in a substantially non-rotatable manner. Therefore, the operation of the transmission ratio variable mechanism 10 is locked. When the drive coil 70 is energized, the lock arm 32 is swung against the urging force of the spring 60 to swing the lock arm 32 about the pin 44a away from the lock holder 31 to release the engaging projection 37 from the corresponding engaging recess 36 of the lock holder 31. Therefore, the lock holder 31 is freed and thereby becomes rotatable together with the motor shaft 18a. In this way, the transmission ratio variable mechanism 10 is released, i.e., is unlocked.

As shown in FIG. 1, the steering control apparatus 50 includes a computer part 51, a memory part 52, an interface part 53, a drive circuit part 54 and an internal bus 55. The computer part 51 includes a microcomputer and is connected to the memory part 52, the interface part 53 and the drive circuit part 54 through the internal bus 55. The memory part 52 includes, for example, an EEPROM and stores data received from the computer part 51. In response to a retrieve command from the computer part 51, the memory part 52 supplies corresponding data to the computer part 51. The interface part 53 is connected to the sensors 13, 17 and supplies outputs of the sensors 13, 17 to the computer part 51. The drive circuit part 54 is connected to the internal coil of the electric motor 18 and energizes the internal coil of the electric motor 18 based on a motor drive command received from the computer part 51. The drive circuit part 54 is connected to the drive coil 70, of the arm driver 33 and energizes the drive coil 70 of the arm driver 33 based on a locking mechanism drive command received from the computer part 51.

Figure 4:
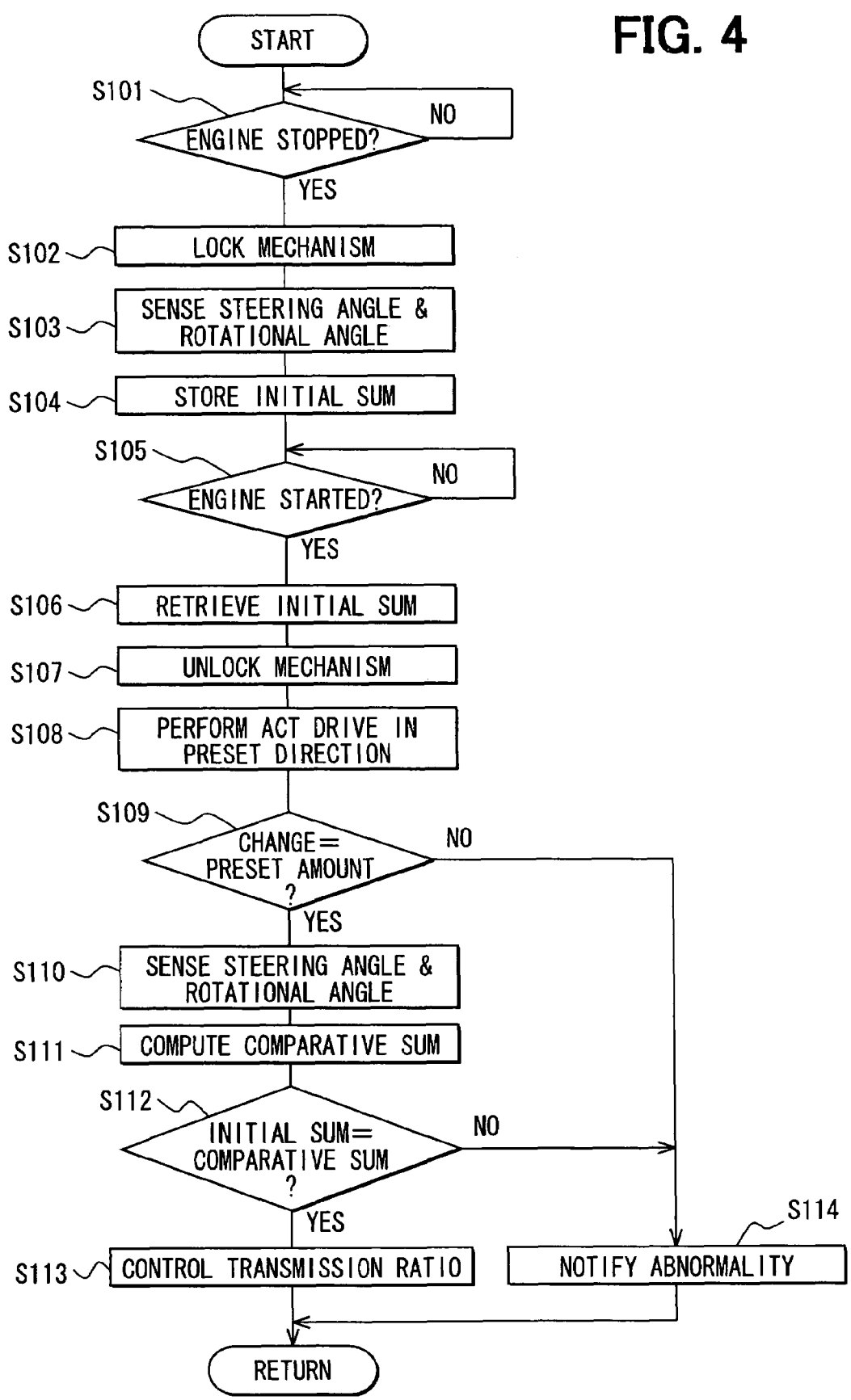
FIG. 4 is a flowchart showing a control operation of the vehicle steering system of the first embodiment.

Next, the control operation of the steering control apparatus 50 will be described with reference to FIG. 4. This control operation is performed by a CPU of the computer part 51 through execution of a control program stored in a ROM of the computer part 51.

At step S101, the computer part 51 determines whether the engine of the vehicle is stopped (i.e., in a stopped state of the engine). When YES is returned at step S101, the computer part 51 proceeds to step S102. The stopped state of the engine may be sensed by checking presence of an OFF operation of an ignition switch by a vehicle user. Alternatively, in a case of an engine, which is operable in an idle stop mode, the stopped state of the engine may be sensed by checking presence of an engine stop command from a control circuit of the engine.

At step S102, the computer part 51 outputs the corresponding locking mechanism drive command to the drive circuit part 54 to drive the lock arm 32 by deenergizing the drive coil 70 and thereby to lock the transmission ratio variable mechanism 10. Under the locked state of the transmission ratio variable mechanism 10, the computer part 51 senses the steering angle θh of the steering wheel 2 and the rotational angle θa of the electric actuator 16 at step S103. Then, at step S104, the computer part 51 computes a sum (θh+θa) of the steering angle θh and the rotational angle θa, which are sensed at step S103. Then, the computer part 51 stores the computed result (the sum) in the memory part 52 as an initial sum θadd0.

Then, at step S105, the computer part 51 determines whether the engine is started (i.e., in a started state of the engine). When YES is returned at step S105, the computer part 51 proceeds to step S106. The started state of the engine may be sensed by, for example, checking presence of an ON operation of the ignition switch by the vehicle user. Alternatively, in the case of the engine, which is operable in the idle stop mode, the started state of the engine may be sensed by checking presence of an engine start command from a control circuit of the engine.

Next, at step S106, the computer part 51 retrieves the initial sum θadd0, which is stored in the memory part 52 at step S104, from the memory part 52.

Thereafter, at step S107, the computer part 51 outputs the corresponding locking mechanism drive command to the drive circuit part 54 to drive the lock arm 32 by energizing the drive coil 70 and thereby to release the lock of the transmission ratio variable mechanism 10, i.e., to unlock the transmission ratio variable mechanism 10. At step S108, the computer part 51 outputs the motor drive command to the drive circuit part 54, so that the electric motor 18 of the electric actuator 16 is rotated (hereinafter, this rotational drive operation of the electric motor 18 will be referred to as "ACT rotational drive operation") to continuously rotate the lock holder 31. At this time, the motor drive command is generated to rotate the ring gear 19b by a preset rotational angle (preset value) Δθe in a preset rotational direction D, which is one of a normal rotational direction and a reverse rotational direction. Here, the preset rotational angle Δθe is set to be an angle, with which complete disengagement of the engaging projection 37 of the lock arm 32 from the corresponding engaging recess 36 of the lock holder 31 is confirmable. For instance, the preset rotational angle Δθe may be set to be larger than an angular width of the engaging recess 36, which is measured in the rotational direction. At step S109, the computer part 51 determines whether an angular change in the rotational angle θa reaches the preset rotational angle Δθe based on output data of the rotational angle sensor 17. When NO is returned at step S109, the computer part 51 determines that the transmission ratio variable mechanism 10 cannot be unlocked due to an abnormality of the transmission ratio variable mechanism 10, so that the computer part 51 proceeds to step S114. At step S114, the computer part 51 notifies the abnormality of the transmission ratio variable mechanism 10 to the user. In contrast, when YES is returned at step S109, the computer part 51 determines that the transmission ratio variable mechanism 10 is unlocked, so that the computer part 51 proceeds to step S110.

At step S110, the computer part 51 senses the steering angle θh of the steering wheel 2 and the rotational angle θa of the electric actuator 16 based on the output data of the sensors 13, 17. At step S111, the computer part 51 computes a sum (θh+θa) of the steering angle θh and the rotational angle θa, which are sensed at step S110. Then, the computer part 51 defines the computed result (the sum) as a comparative sum θadd. At step S112, the computer part 51 compares the initial sum θadd0, which is retrieved at step S106, and the comparative sum θadd, which is computed at step S111, and the computer part 51 determines whether the initial sum θadd0 and the comparative sum θadd are equal to each other.

Here, it can be assumed that the vehicle is in the stopped state at steps S103 to S110, which are executed during the stopped state of the engine or right after the starting of the engine. Therefore, based on the above described principle, the initial sum θadd0, which is obtained by summing the steering angle θh and the rotational angle θa sensed at step S103, should be equal to the comparative sum θadd, which is obtained by summing the steering angle θh and the rotational angle θa sensed at step S110. However, in a case where an abnormality exists in the memory part 52, the initial sum θadd0, which is retrieved at step S106, may possibly contain an error. Therefore, when it is determined that the initial sum θadd0 and the comparative sum θadd are not equal to each other at step S112, the computer part 51 determines that the abnormality of the memory part 52 is sensed, and thereby the computer part 51 proceeds to step S114. At step S114, the computer part 51 notifies the abnormality of the memory part 52 to the user. In contrast, when it is determined that the initial sum θadd0 and the comparative sum θadd are equal to each other at step S112, the computer part 51 determines that the normality of the memory part 52 is sensed, and thereby the computer part 51 proceeds to step S113.

At step S113, a transmission ratio control operation is performed to control the transmission ratio until the engine is stopped. Here, in the transmission ratio control operation, the computer part 51 outputs the motor drive command to change the transmission ratio R in a manner that implements the ACT rotational drive operation in accordance with the vehicle state information (e.g., the vehicle speed), the steering angle θh, the rotational angle θa and the turning angle θs. In the transmission control operation, the vehicle state information, the steering angle θh, the rotational angle θa and the turning angle θs are stored and updated in the memory part 52 and are retrieved whenever required.

According to the first embodiment, when the engine stop and the engine start are repeated, the locking of the transmission ratio variable mechanism 10 (step S102) and the unlocking of the transmission ratio variable mechanism 10 (step S107) are repeated. Every time when the locking and unlocking of the transmission ratio variable mechanism 10 are repeated, the ACT rotational drive operation (step S108) for checking the unlocking of the transmission ratio variable mechanism 10 is performed. However, the normality/abnormality determination of the memory part 52 (step S112) is performed based on the sum of the rotational angle θa and the steering angle θh before the checking of the unlocking and the sum of the rotational angle θa and the steering angle θh after the checking of the unlocking, i.e., is performed based on the physical quantity, which does not depend on the rotational angle θa of the electric actuator 16 in the stopped state of the vehicle.

In the locked state (step S103) of the transmission ratio variable mechanism 10, which is implemented between the time of stopping the engine and the time of restarting the engine, changes in the steering angle θh and the rotational angle θa are mechanically limited. Therefore, the initial sum θa, which is the sum of the steering angle θh and the rotational angle θa, is accurately obtained and is used in the normality/abnormality determination (step S112). Thus, this determination can be made more accurately.

In the first embodiment, the locking mechanism 30 corresponds to a lock means, and the lock holder 31 corresponds to a rotatable member. Furthermore, the computer part 51 corresponds to a control means and a sensing means, and the memory part 52 corresponds to a storage means.

Second Embodiment

Figure 5:
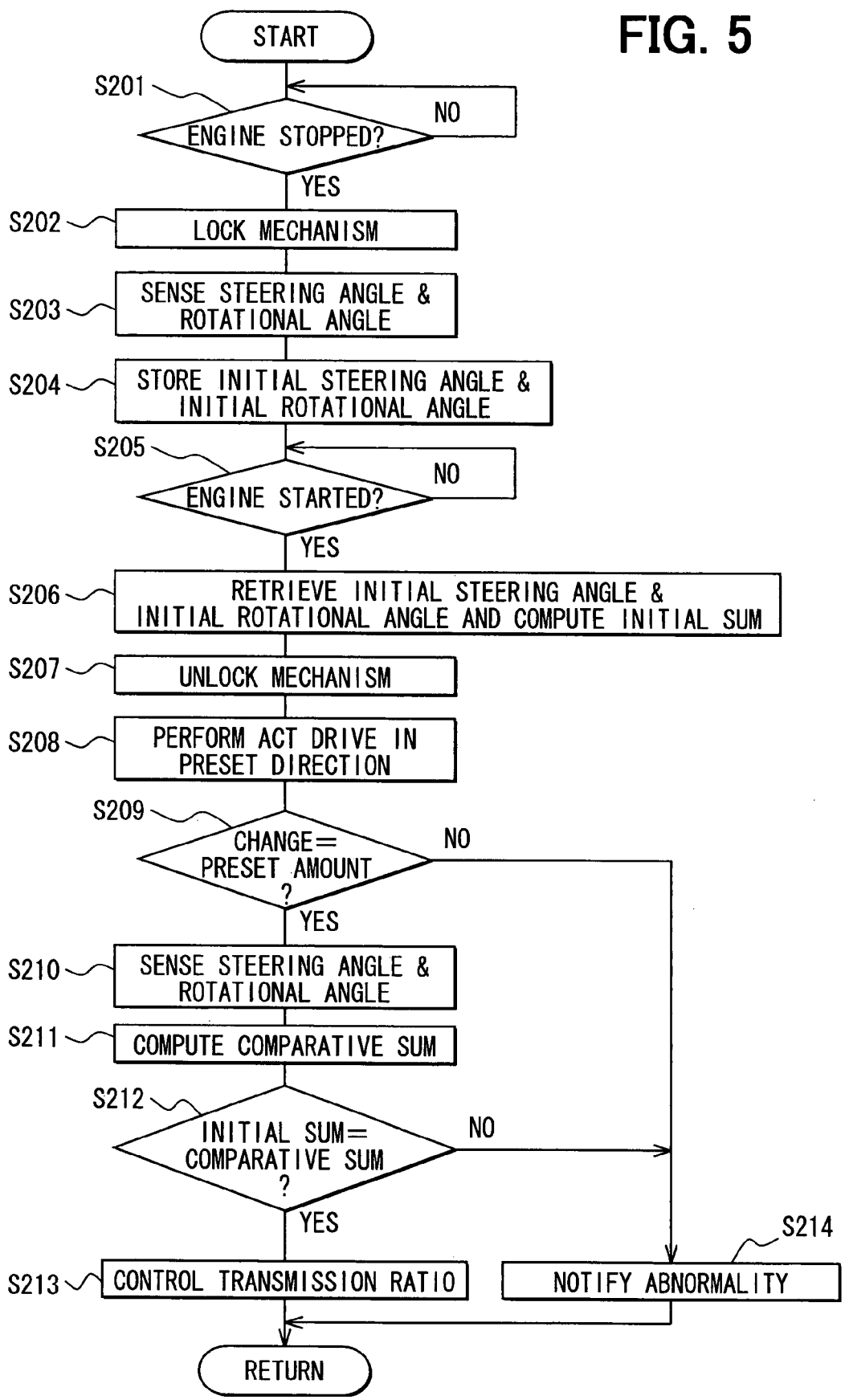
FIG. 5 is a flowchart showing a control operation of a vehicle steering system according to a second embodiment of the present invention.

With reference to FIG. 5, a second embodiment of present invention is similar to the first embodiment except a portion of the control operation. In the second embodiment, step S204 is executed in place of step S104 of the first embodiment, and step S206 is executed in place of step S106 of the first embodiment.

Specifically, at step S204, the steering angle θh and the rotational angle θa, which are sensed at step S203, are stored in the memory part 52 as an initial steering angle θh0 and an initial rotational angle θa0, respectively, in the locked state of the transmission ratio variable mechanism 10.

At step S206, the initial steering angle θh0 and the initial rotational angle θa0, which are stored in the memory part 52 at step S204, are retrieved from the memory part 52. Furthermore, at step S206, the computer part 51 computes a sum (θh0+θa0) of the retrieved initial steering angle θh0 and the retrieved initial rotational angle θa0. Here, the computed result is defined as an initial sum θadd0.

In the present embodiment, steps S201-S203, S205, S207-S214 are substantially the same as steps S101-S103, S105, S107-S114 of the first embodiment.

Even in the second embodiment, the normality/abnormality determination of the memory part 52 (step S212) is executed based on the physical quantity, which does not depend on the rotational angle θa of the electric actuator 16 in the stopped state of the vehicle. Therefore, the valid determination can be made. In the locked state of the transmission ratio variable mechanism 10, changes in the steering angle θh and the rotational angle θa are limited. Since these physical quantities are used as the initial steering angle θh0 and the initial rotational angle θa0 in the computation (step S206) of the initial sum θadd0, the normality/abnormality determination (step S212), which is made based on the initial sum θadd0, becomes more accurate.

Third Embodiment

Figure 6:
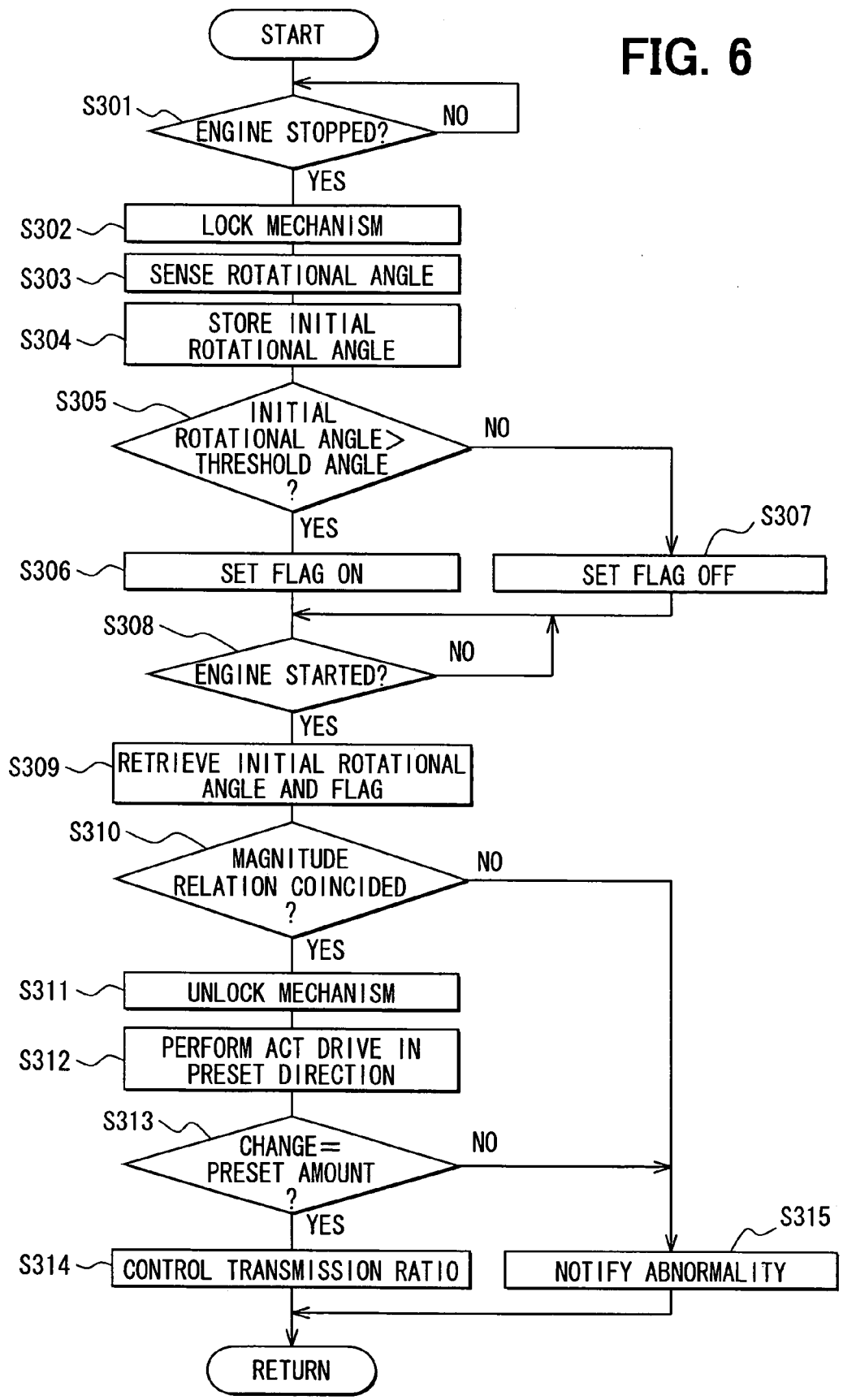
FIG. 6 is a flowchart showing a control operation of a vehicle steering system according to a third embodiment of the present invention.

With reference to FIG. 6, a third embodiment of present invention is similar to the first embodiment except a portion of the control operation. In the third embodiment, steps S303-S307 are executed in place of steps S103, S104 of the first embodiment, and as shown in FIG. 6, steps S309, S310 are executed after step S308, which is substantially the same as step S105 of the first embodiment.

Specifically, at step S303, the computer part 51 senses the rotational angle θa based on the output data of the rotational angle sensor 17. At step S304, the computer part 51 stores the rotational angle θa, which is sensed at step S303, in the memory part 52 as the initial rotational angle θa0 in the locked state of the transmission ratio variable mechanism 10. At step S305, the computer part 51 compares the rotational angle θa, i.e., the initial rotational angle θa0, which is sensed at step S303, with a threshold angle (threshold value) θth, which is stored in the ROM of the computer part 51, and the computer part 51 determines whether the initial rotational angle θa0 is larger than the threshold angle θth. In a state where the steerable vehicle wheels 5R, 5L are oriented in a straight-through direction, which permits straight through movement of the vehicle, a reference point (a zero point) of the rotational angle θa is set. Here, the threshold angle θth is set as a practically possible angle of the rotational angle θa from the reference point at least in the preset rotational direction D in the normal operation. When YES is returned at step S305 in view of the threshold angle θth, i.e., when the initial rotational angle θa0 is larger than the threshold angle θth, the computer part 51 sets a flag F, which is stored in the memory part 52, into an ON state at step S306. Then, the computer part 51 proceeds to step S308. In contrast, when NO is returned at step S305, i.e., when the initial rotational θa0 is not larger than the threshold angle θth, the computer part 51 proceeds to step S307. At step S307, the computer part 51 sets the flag F, which is stored in the memory part 52, into an OFF state. Then, the computer part 51 proceeds to step S308. The flag F serves as "initial information", which indicates the magnitude relation between the initial rotational angle θa0 and the threshold angle θth in the locked state of the transmission ratio variable mechanism 10.

At step S309, the computer part 51 retrieves the initial rotational angle θa0, which is stored in the memory part 52 at step S304, and the flag F, which is set in the memory part 52 at step S306 or step S307. At step S310, the computer part 51 compares the initial rotational angle θa0, which is retrieved at step S309, with the threshold angle θth, which is stored in the ROM of the computer part 51, and the computer part 51 determines whether the magnitude relation between the initial rotational angle θa0 and the threshold angle θth coincides with the magnitude relation thereof indicated by the flag F, which is retrieved at step S309.

Here, when the memory part 52 is normal, the magnitude relation between the initial rotational angle θa0 and the threshold angle θth should coincide with the magnitude relation thereof indicated by the flag F. Therefore, as shown in FIG. 7, in a case where the initial rotational angle θa0 is equal to or smaller than the threshold angle θth while the flag F being held in the ON state, or in a case where the initial rotational angle θa0 is larger than the threshold angle θth while the flag F being held in the OFF state, the computer part 51 determines that the abnormality of the memory part 52 is sensed due to the difference in the compared magnitude relations. As a result, the computer part 51 proceeds to step S315. In contrast, in a case where the initial rotational angle θa0 is larger than the threshold angle θth while the flag F being held in the ON state, or in a case where the initial rotational angle θa0 is equal to or less than the threshold angle θth while the flag F being held in the OFF state, the computer part 51 determines that the normality of the memory part 52 is sensed due to the consistency in the compared magnitude relations. As a result, the computer part 51 proceeds to step S311.

In the present embodiment, steps S301, S302, S311-S313, S314, S315 are substantially the same as steps S101, S102, S107-S109, S113, S114 of the first embodiment.

According to the third embodiment, in a case where the engine is stopped in the absence of operation of the steering wheel 2 after starting of the execution of the transmission ratio control operation (step S314), when the next control operation starts, the transmission ratio variable mechanism 10 is locked (step S302). At this time, there is a possibility of that the rotational angle θa exceeds the threshold angle θth due to the ACT rotational drive operation (step S312) in the previous control operation. In such a case, the rotational angle θa, which is larger than the threshold angle θth, is stored in the memory part 52 as the initial rotational angle θa0 (step S304). Therefore, the initial rotational angle θa0, which is retrieved from the normal memory part 52 (step S309), also is larger than the threshold angle θth. However, according to the third embodiment, the flag F, which indicates the magnitude relation between the initial rotational angle θa0 and the threshold angle θth, is temporarily stored in the memory part 52 (step S306) and is retrieved together with the initial rotational angle θa0 (step S309). Thus, as long as the memory part 52 is normal, there should be no discrepancy between the retrieved flag F and the retrieved initial rotational angle θa0. Therefore, according to the normality/abnormality determination (step S310) that is based on the retrieved flag F and the retrieved initial rotational angle θa, even when the rotational angle θa is larger than the threshold angle θth, it is possible to accurately sense the abnormality of the memory part 52.

Fourth Embodiment

Figure 8:
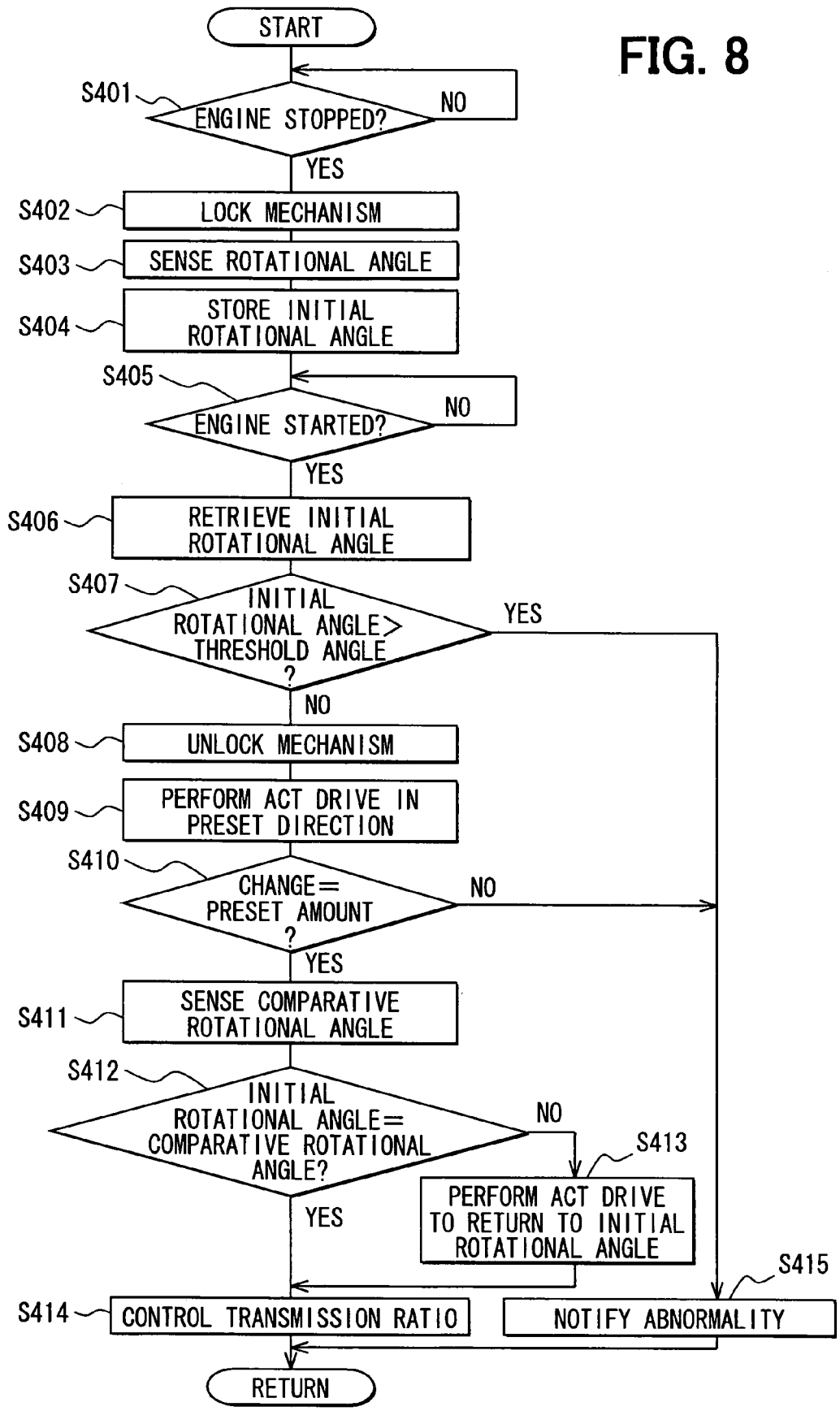
FIG. 8 is a flowchart showing a control operation of a vehicle steering system according to a fourth embodiment of the present invention.

With reference to FIG. 8, a fourth embodiment of present invention is similar to the first embodiment except a portion of the control operation. In the fourth embodiment, steps S403, S404 are executed in place of steps S103, S104 of the first embodiment. Also, steps S406, S407 are executed in place of step S106 of the first embodiment. Furthermore, steps S411-S413 are executed in place of steps S110-S112 of the first embodiment.

Specifically, at step S403, the computer part 51 senses the rotational angle θa based on the output data of the rotational angle sensor 17. At step S404, the computer part 51 stores the sensed result in the memory part 52 as the initial rotational angle θa0 in the locked state of the transmission ratio variable mechanism 10.

At step S406, the computer part 51 retrieves the initial rotational angle θa0, which is stored in the memory part 52 at step S404, from the memory part 52. At step S407, the computer part 51 compares the initial rotational angle θa0, which is retrieved at step S406, with the threshold angle θth, which is stored in the ROM of the computer part 51. Then, the computer part 51 determines whether the initial rotational angle θa0 is larger than the threshold angle θth. Here, the threshold angle θth is similar to the threshold angle θth discussed in the third embodiment, and thereby the threshold angle θth is set as a practically possible angle of the rotational angle θa from the reference point at least in the preset rotational direction D in the normal operation. When YES is returned based on this threshold angle θth at step S407, the computer part 51 determines that the abnormality of the memory part 52 is sensed, and thereby the computer part 51 proceeds to step S415. In contrast, when NO is returned at step S407, the computer part 51 determines that the normality of the memory part 52 is sensed, and thereby the computer part 51 proceeds to step S408.

At step S408, the transmission ratio variable mechanism 10 is unlocked. At step S411, which is executed upon the checking of the unlocking of the transmission ratio variable mechanism 10 at steps S409, S410, the computer part 51 senses the rotational angle θa based on the output data of the rotational angle sensor 17, and the computer part 51 defines the sensed result as the comparative rotational angle θac. At step S412, the computer part 51 compares the initial rotational angle θa0, which is retrieved at step S406, with the comparative rotational angle θac, which is sensed at step S411, and the computer part 51 determines whether the initial rotational angle θa0 and the comparative rotational angle θac are equal to each other. When NO is returned at step S412, the computer part 51 proceeds to step S413 and thereafter proceeds to step S414. At step S413, the computer part 51 outputs the motor drive command to the drive circuit part 54 to implement the ACT rotational drive operation, which is executed upon reversing the preset rotational direction D, and thereby to return the rotational angle θa to the initial rotational angle θa0. In contrast, when YES is returned at step S412, the computer part 51 directly proceeds to step S414.

In the present embodiment, steps S401, S402, S405, S408-S410, S414, S415 are substantially the same as steps S101, S102, S105, S107-S109, S113, S114 of the first embodiment.

According to the fourth embodiment, in the case where the engine is stopped in the absence of operation of the steering wheel 2 after starting of the execution of the transmission ratio control operation (step S414), when the next control operation starts, the transmission ratio variable mechanism 10 is locked (step S402). At this time, through the previous control operation (steps S412, S413), the rotational angle θa coincides with the initial rotational angle θa0. Therefore, when the initial rotational angle θa0, which is first stored in the memory part 52, is set to the value smaller than the threshold angle θth, the initial rotational angle θa0, which does not become larger than the threshold angle θth all the time, is stored in the memory part 52 (step S404). Thus, as long as the memory part 52 is normal, the initial rotational θa0, which is retrieved from the memory part 52 (step S406), should not become larger than the threshold angle θth. Therefore, the abnormality of the memory part 52 can be sensed accurately (step S407).

Furthermore, the returning to the initial rotational angle θa0 upon the detection of the normality of the memory part 52 (step S407) is executed such that the initial rotational angle θa0, which is retrieved from the normal memory part 52, is used as an execution condition and also as a target point. Therefore, the returning to the normal initial rotational angle θa0, which does not exceed the threshold angle θth, becomes possible.

Fifth Embodiment

Figure 9:
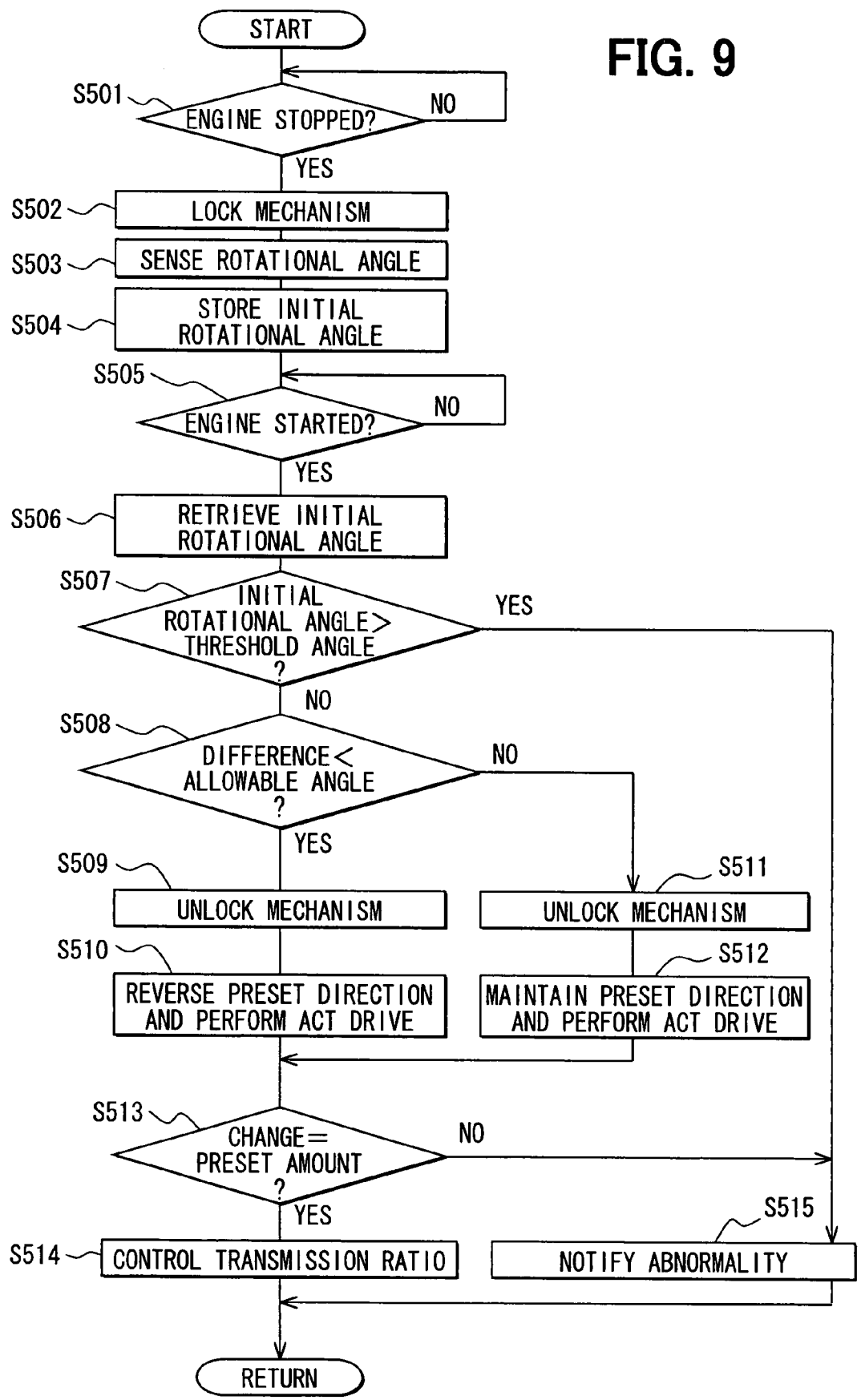
FIG. 9 is a flowchart showing a control operation of a vehicle steering system according to a fifth embodiment of the present invention.

With reference to FIG. 9, a fifth embodiment of present invention is similar to the fourth embodiment except a portion of the control operation. In the fifth embodiment, the threshold angle θth is set as a practically possible angle of the rotational angle θa from the reference point in either of the normal rotational direction and the reverse rotational direction in the normal operation.

Furthermore, in the fifth embodiment, as shown in FIG. 9, steps S507-S515 are executed after steps S501-S506, which are substantially the same as steps S401-S406 of the fourth embodiment.

Specifically, at step S507, the determination similar to that of step S407 of the fourth embodiment is made. Based on the result of this determination, when the computer part 51 senses the abnormality of the memory part 52, the computer part 51 proceeds to step S515. In contrast, when the computer part 51 senses the normality of the memory part 52, the computer part 51 proceeds to step S508.

At step S508, the computer part 51 compares the initial rotational angle θa0, which is retrieved at step S506, with the threshold angle θth, which is stored in the ROM of the computer part 51, and the computer part 51 determines whether a difference (θth−θa0) between the threshold angle θth and the initial rotational angle θa0 is smaller than an allowable angle (allowable value) Δθp. When YES is returned at step S508, the computer part 51 unlocks the transmission ratio variable mechanism 10 at step S509, which is substantially the same as step S408 of the fourth embodiment. Then, the computer part 51 proceeds to step S510 and then proceeds to step S513. At step S510, the computer part 51 outputs the corresponding motor drive command to the drive circuit part 54 to implement the ACT rotational drive operation, in which the preset rotational direction D is reversed. That is, at step S510, the motor drive command is generated in a manner that causes the reverse of the preset rotational direction D used in the previous control operation for rotating the ring gear 19b by the preset rotational angle Δθe. When NO is returned at step S508, the computer part 51 proceeds to steps S511, S512, which are substantially the same as steps S408, S409 of the fourth embodiment. More specifically, at step S511, the computer part 51 unlocks the transmission ratio variable mechanism 10. Then, at step S512, the computer part 51 performs the ACT rotational drive operation while maintaining the same preset rotational direction D. Thereafter, the computer part 51 proceeds to step S513.

The preset rotational angle Δθe, which is used in the ACT rotational drive operation at steps 512 or S510, is set to be smaller than the allowable angle Δθp. In this way, it is possible to limit the rotational angle θa from exceeding the threshold angle θth in the ACT rotational drive operation at step S512. Furthermore, steps S513, S514, S515 are substantially the same as steps S410, S414, S415 of the fourth embodiment.

According to the fifth embodiment, in the case where the engine is stopped in the absence of operation of the steering wheel 2 after starting of the execution of the transmission ratio control operation (step S514), when the next control operation starts, the transmission ratio variable mechanism 10 is locked (step S502). At this time, the rotational angle θa is always kept below the threshold angle θth in both of the normal rotational direction and the reverse rotational direction in the previous control operation (steps S510, S512). Thus, the initial rotational angle θa0, which does not exceed the threshold angle θth, is always stored in the memory part 52 (step S504). Thus, as long as the memory part 52 is normal, the initial rotational angle θa0, which is retrieved from the memory part 52 (step S506), should not become larger than the threshold angle θth. Therefore, the abnormality of the memory part 52 can be sensed accurately (step S507).

Furthermore, the unlocking of the transmission ratio variable mechanism 10 (steps S509, S511) and the confirming of the unlocking of the transmission ratio variable mechanism 10 (steps S510, S512, S513), which are executed after the sensing of the normality of the memory part 52 (step S507), require the initial rotational angle θa0, which is retrieved from the normal memory part 52, as the execution condition thereof. Thus, the rotational angle θa, which does not exceed the threshold angle θth, can be correctly and reliably implemented through the ACT rotational drive operation (steps S510, S512), which is performed to check the unlocking of the transmission ratio variable mechanism 10.

The various embodiments of the present invention have been described. However, the present invention is not limited to the above embodiments, and thereby the above embodiments may be modified in various ways without departing from the scope and spirit of the present invention.

For example, in the first to fifth embodiments, the unlocking of the transmission ratio variable mechanism 10 (steps S107, S207, S311, S408, S509, S511) and the ACT rotational drive operation for checking the unlocking of the transmission ratio variable mechanism 10 (steps S108, S208, S312, S409, S510, S512) are executed in this order. However, the unlocking of the transmission ratio variable mechanism 10 and the ACT rotational drive operation for checking the unlocking of the transmission ratio variable mechanism 10 may be executed simultaneously.

Additional advantages and modifications will readily occur to those skilled in the art. The invention in its broader terms is therefore not limited to the specific details, representative apparatus, and illustrative examples shown and described.

What is claimed is:

1. A vehicle steering system comprising:
   a transmission ratio variable mechanism that is placed between a steering wheel and steerable vehicle wheels in a vehicle and includes an electric actuator, which is rotated to change a transmission ratio between a steering angle of the steering wheel and a turning angle of the steerable vehicle wheels, wherein the transmission ratio variable mechanism makes a change in the turning angle of the steerable vehicle wheels in a generally linear relationship with a sum of the steering angle of the steering wheel and a rotational angle of the electric actuator;
   a rotatable member that is rotated synchronously with the electric actuator;
   a lock means for locking and unlocking the transmission ratio variable mechanism, wherein the lock means locks the transmission ratio variable mechanism by holding the rotatable member and unlocks the transmission ratio variable mechanism by releasing the rotatable member;
   a control means for controlling the electric actuator and for checking whether the unlocking of the transmission ratio variable mechanism succeeds by rotating the rotatable member through rotation of the electric actuator in a stopped state of the vehicle;
   a storage means for storing an initial sum, which is obtained by summing the steering angle of the steering wheel and the rotational angle of the electric actuator before the checking of the unlocking of the transmission ratio variable mechanism by the control means; and
   a sensing means for sensing an abnormality of the storage means, wherein the sensing means determines that the storage means is abnormal when a sum, which is obtained by summing the steering angle of the steering wheel and the rotational angle of the electric actuator after the checking of the unlocking of the transmission ratio variable mechanism by the control means, differs from the initial sum, which is retrieved from the storage means.

2. The vehicle steering system according to claim 1, wherein the initial sum is obtained and is stored in the storage means in a locked state of the transmission ratio variable mechanism.

3. The vehicle steering system according to claim 1, wherein the electric actuator includes:
   an electric motor; and
   a speed reducer that reduces a rotational speed, which is transmitted from the electric motor, and outputs the rotation of the reduced rotational speed.

4. A vehicle steering system comprising:
   a transmission ratio variable mechanism that is placed between a steering wheel and steerable vehicle wheels in a vehicle and includes an electric actuator, which is rotated to change a transmission ratio between a steering angle of the steering wheel and a turning angle of the steerable vehicle wheels, wherein the transmission ratio variable mechanism makes a change in the turning angle of the steerable vehicle wheels in a generally linear relationship with a sum of the steering angle of the steering wheel and a rotational angle of the electric actuator;
   a rotatable member that is rotated synchronously with the electric actuator;
   a lock means for locking and unlocking the transmission ratio variable mechanism, wherein the lock means locks the transmission ratio variable mechanism by holding the rotatable member and unlocks the transmission ratio variable mechanism by releasing the rotatable member;
   a control means for controlling the electric actuator and for checking whether the unlocking of the transmission ratio variable mechanism succeeds by rotating the rotatable member through rotation of the electric actuator in a stopped state of the vehicle;
   a storage means for storing an initial steering angle of the steering wheel and an initial rotational angle of the electric actuator, which are obtained before the checking of the unlocking of the transmission ratio variable mechanism by the control means; and
   a sensing means for sensing an abnormality of the storage means, wherein the sensing means determines that the storage means is abnormal when a sum, which is obtained by summing the steering angle of the steering wheel and the rotational angle of the electric actuator after the checking of the unlocking of the transmission ratio variable mechanism by the control means, differs from a sum, which is obtained by summing the initial steering angle of the steering wheel and the initial rotational angle of the electric actuator that are retrieved from the storage means.

5. The vehicle steering system according to claim 4, wherein the initial steering angle of the steering wheel and the initial rotational angle of the electric actuator are obtained and are stored in the storage means in a locked state of the transmission ratio variable mechanism.

6. The vehicle steering system according to claim 4, wherein the electric actuator includes:
   an electric motor; and
   a speed reducer that reduces a rotational speed, which is transmitted from the electric motor, and outputs the rotation of the reduced rotational speed.

7. A vehicle steering system comprising:
   a transmission ratio variable mechanism that is placed between a steering wheel and steerable vehicle wheels in a vehicle and includes an electric actuator, which is rotated to change a transmission ratio between a steering angle of the steering wheel and a turning angle of the steerable vehicle wheels;
   a rotatable member that is rotated synchronously with the electric actuator;
   a lock means for locking and unlocking the transmission ratio variable mechanism, wherein the lock means locks the transmission ratio variable mechanism by holding the rotatable member and unlocks the transmission ratio variable mechanism by releasing the rotatable member;
   a control means for controlling the electric actuator and for checking whether the unlocking of the transmission ratio variable mechanism succeeds by rotating the rotatable member through rotation of the electric actuator;
   a storage means for storing:
      an initial rotational angle of the electric actuator, which is obtained in a locked state of the transmission ratio variable mechanism before the checking of the unlocking of the transmission ratio variable mechanism by the control means; and
      initial information, which indicates a magnitude relation between the initial rotational angle of the electric actuator and a threshold angle set in a preset rotational direction before the checking of the unlocking of the transmission ratio variable mechanism by the control means; and
   a sensing means for sensing an abnormality of the storage means, wherein the sensing means determines that the storage means is abnormal when a magnitude relation between the initial rotational angle of the electric actuator, which is retrieved from the storage means, and the threshold angle differs from the magnitude relation, which is indicated by the initial information that is retrieved from the storage means.

8. The vehicle steering system according to claim 7, wherein:
   the sensing means determines that the storage means is normal when the magnitude relation between the initial rotational angle of the electric actuator, which is retrieved from the storage means, and the threshold angle coincides with the magnitude relation, which is indicated by the initial information that is retrieved from the storage means; and
   when the sensing means determines that storage means is normal, the control means unlocks the transmission ratio variable mechanism by controlling the lock means and checks whether the unlocking of the transmission ratio variable mechanism succeeds by rotating the rotatable member through the rotation of the electric actuator.

9. The vehicle steering system according to claim 7, wherein the electric actuator includes:
   an electric motor; and
   a speed reducer that reduces a rotational speed, which is transmitted from the electric motor, and outputs the rotation of the reduced rotational speed.

10. A vehicle steering system comprising:
   a transmission ratio variable mechanism that is placed between a steering wheel and steerable vehicle wheels in a vehicle and includes an electric actuator, which is rotated to change a transmission ratio between a steering angle of the steering wheel and a turning angle of the steerable vehicle wheels;
   a rotatable member that is rotated synchronously with the electric actuator;
   a lock means for locking and unlocking the transmission ratio variable mechanism, wherein the lock means locks the transmission ratio variable mechanism by holding the rotatable member and unlocks the transmission ratio variable mechanism by releasing the rotatable member;

a control means for controlling the electric actuator and for checking whether the unlocking of the transmission ratio variable mechanism succeeds by rotating the rotatable member through rotation of the electric actuator;

a storage means for storing an initial rotational angle of the electric actuator, which is obtained in a locked state of the transmission ratio variable mechanism before the checking of the unlocking of the transmission ratio variable mechanism by the control means; and a sensing means for sensing an abnormality of the storage means, wherein the sensing means determines that the storage means is abnormal when the initial rotational angle of the electric actuator, which is retrieved from the storage means, is larger than a threshold angle set in a preset rotational direction, wherein when a rotational angle of the electric actuator, which is obtained after the checking of the unlocking of the transmission ratio variable mechanism, differs from the initial rotational angle of the electric actuator, which is retrieved from the storage means, the control means returns the rotational angle of the electric actuator to the initial rotational angle of the electric actuator by rotating the electric actuator.

11. The vehicle steering system according to claim 10, wherein:

the sensing means determines that the storage means is normal when the initial rotational angle of the electric actuator, which is retrieved from the storage means, is not larger than the threshold angle; and when the sensing means determines that storage means is normal, the control means unlocks the transmission ratio variable mechanism by controlling the lock means and checks whether the unlocking of the transmission ratio variable mechanism succeeds by rotating the rotatable member through the rotation of the electric actuator.

12. The vehicle steering system according to claim 10, wherein the electric actuator includes:

an electric motor; and a speed reducer that reduces a rotational speed, which is transmitted from the electric motor, and outputs the rotation of the reduced rotational speed.

13. A vehicle steering system comprising:

a transmission ratio variable mechanism that is placed between a steering wheel and steerable vehicle wheels in a vehicle and includes an electric actuator, which is rotated to change a transmission ratio between a steering angle of the steering wheel and a turning angle of the steerable vehicle wheels;

a rotatable member that is rotated synchronously with the electric actuator;

a lock means for locking and unlocking the transmission ratio variable mechanism, wherein the lock means locks the transmission ratio variable mechanism by holding the rotatable member and unlocks the transmission ratio variable mechanism by releasing the rotatable member;

a control means for controlling the electric actuator and for checking whether the unlocking of the transmission ratio variable mechanism succeeds by rotating the rotatable member through rotation of the electric actuator in a preset rotational direction;

a storage means for storing an initial rotational angle of the electric actuator, which is obtained in a locked state of the transmission ratio variable mechanism before the checking of the unlocking of the transmission ratio variable mechanism by the control means; and a sensing means for sensing an abnormality of the storage means, wherein the sensing means determines that the storage means is abnormal when the initial rotational angle of the electric actuator, which is retrieved from the storage means, is larger than a threshold angle set in the preset rotational direction, wherein when a difference between the initial rotational angle of the electric actuator, which is retrieved from the storage means, and the threshold angle, is smaller than an allowable angle, the control means unlocks the transmission ratio variable mechanism by controlling the lock means and checks whether the unlocking of the transmission ratio variable mechanism succeeds by rotating the rotatable member through rotation of the electric actuator upon reversing the preset rotational direction of the electric actuator.

14. The vehicle steering system according to claim 13, wherein when the difference between the initial rotational angle of the electric actuator, which is retrieved from the storage means, and the threshold angle, is equal to or larger than the allowable angle, the control means unlocks the transmission ratio variable mechanism by controlling the lock means and checks whether the unlocking of the transmission ratio variable mechanism succeeds by rotating the rotatable member through rotation of the electric actuator while maintaining the preset rotational direction of the electric actuator.

15. The vehicle steering system according to claim 14, wherein when the control means checks whether the unlocking of the transmission ratio variable mechanism succeeds, the control means rotates the electric actuator by a preset rotational angle, which is smaller than the allowable angle.

16. The vehicle steering system according to claim 13, wherein:

the sensing means determines that the storage means is normal when the initial rotational angle of the electric actuator, which is retrieved from the storage means, is not larger than the threshold angle; and when the sensing means determines that storage means is normal, the control means unlocks the transmission ratio variable mechanism by controlling the lock means and checks whether the unlocking of the transmission ratio variable mechanism succeeds.

17. The vehicle steering system according to claim 13, wherein the electric actuator includes:

an electric motor; and a speed reducer that reduces a rotational speed, which is transmitted from the electric motor, and outputs the rotation of the reduced rotational speed.

* * * * *